US009728025B2

(12) United States Patent
Hamada et al.

(10) Patent No.: US 9,728,025 B2
(45) Date of Patent: Aug. 8, 2017

(54) PORTABLE DEVICE, COMMUNICATION DEVICE, AND COMMUNICATION SYSTEM

(71) Applicants: Kazuya Hamada, Aichi (JP); Takahiro Inaguma, Aichi (JP); Yosuke Tomita, Aichi (JP)

(72) Inventors: Kazuya Hamada, Aichi (JP); Takahiro Inaguma, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/921,816

(22) Filed: Oct. 23, 2015

(65) Prior Publication Data

US 2016/0117877 A1 Apr. 28, 2016

(30) Foreign Application Priority Data

Oct. 23, 2014 (JP) ................................ 2014-216716

(51) Int. Cl.
*H04L 9/32* (2006.01)
*G07C 9/00* (2006.01)

(52) U.S. Cl.
CPC .................... *G07C 9/00309* (2013.01); *G07C 2009/00357* (2013.01); *G07C 2009/00555* (2013.01)

(58) Field of Classification Search
CPC ............... H04W 4/023; G07C 9/00309; G07C 2009/00357
USPC ........................................................ 340/5.61
See application file for complete search history.

(56) References Cited

U.S. PATENT DOCUMENTS 5,926,142 A * 7/1999 Rathgeb .............. B60C 23/0444 343/711
2006/0273887 A1* 12/2006 Yamamoto .............. B60R 25/33 340/426.36
2010/0201483 A1* 8/2010 Nakajima ............ B60R 25/245 340/5.61

FOREIGN PATENT DOCUMENTS

JP 2006-342545 A 12/2006
JP 2010-121297 A 6/2010

* cited by examiner

*Primary Examiner* — Vernal Brown
(74) *Attorney, Agent, or Firm* — Osha Liang LLP

(57) ABSTRACT

A communication system includes: a vehicle-mounted communication device and a portable device. The communication device includes: a vehicle transmission unit which transmits a plurality of first signals to the portable device, and a vehicle reception unit which receives a second signal transmitted from the portable device. The portable device includes: a portable device reception unit which receives the first signals, a portable device controller which detects signal intensities of the received first signals, and which compares the signal intensities of the first signals, and a portable device transmission unit which transmits the second signal according to control of the portable device controller. The portable device controller sets an output value of the second signal to a predetermined value when a difference between the compared signal intensities of the first signals is equal to or less than a threshold.

10 Claims, 6 Drawing Sheets

PORTABLE DEVICE, COMMUNICATION DEVICE, AND COMMUNICATION SYSTEM

CROSS-REFERENCES TO RELATED APPLICATIONS

This application is based upon and claims the benefit of priority from Japanese Patent Application No. 2014-216716, filed on Oct. 23, 2014; the entire contents of which are incorporated herein by reference.

FIELD

One or more embodiments of the present invention relate to a portable device, a communication device, and a communication system for a vehicle with the portable device and the communication device.

BACKGROUND

In the related art, it has been widely known that a signal for a passive function is transmitted or received between a vehicle communication device that is mounted on a vehicle, and a portable device in a user's possession. Here, the passive function is a function or the like for locking and unlocking a door or the like (opening and closing member) when a user operates a door handle, a door knob switch, or the like without operating the portable device. In this function, when the user performs a predetermined operation on the door handle or the like, a response request signal, which reaches to a predetermined area is transmitted from a vehicle communication device, and a portable device receiving the response request signal responds with a response signal including authentication information. When authentication is successful, locking or unlocking of the door or the like is performed.

Meanwhile, there is a case where theft or intrusion is performed on a vehicle having the passive function using a technique called relay attack. Here, the relay attack is a technique with which a third person with malicious intent performs illegal actions such as unlocking of a vehicle door by allowing communication between the vehicle communication device and the portable device even when a user having a portable device is outside a predetermined area to which a response request signal transmitted from the vehicle transmission device is able to reach, using a repeater.

As a solution to relay attack, for example, in the JP-A-2006-342545, a keyless entry apparatus is disclosed which can easily determine whether or not there is reception of a request signal due to relay attack. In the keyless entry apparatus, a vehicle side transmission unit includes a plurality of transmission antennas which are disposed at different positions on a vehicle, and a portable device reception unit includes a plurality of reception antennas which are disposed toward different axis line directions. A portable device detects intensity of each of signals in the plurality of reception antennas which are transmitted from the plurality of transmission antennas, and compares intensities of the signals in the reception antennas to each other. Accordingly, when the intensities are approximately equal to each other, it is determined that there is a relay attack by using a fact that intensities of signals received by the portable device through a repeater are equal to each other even if the signals are transmitted from the plurality of transmission antennas. In this case, since the portable device does not transmit an answer signal, a door is not unlocked.

In addition, in JP-A-2010-121297, a smart keyless entry system with improved security for preventing relay attack is disclosed. The smart keyless entry system includes masquerade determination means for determining whether or not a person who is in the vicinity of a vehicle is an authorized user. When it is determined by the masquerade determination means that a repeater of a person who is in the vicinity of the vehicle is not the portable device or an authorized user having the portable device is not in the vicinity of the vehicle, unlocking is inhibited with the masquerade determination means lowering an output value of a response signal with which the portable device responds so that an arrival distance of the response signal becomes substantially equal to an arrival distance of a response request signal that is transmitted from the vehicle.

However, when adopting the countermeasure disclosed in JP-A-2006-342545, if a positional relationship between a portable device and a plurality of antennas is a positional relationship in which compared intensities of a plurality of signals are approximately equal to each other, there is an erroneous determination that relay attack is performed, and thus the portable device does not transmit an answer signal and a passive function does not function. For example, in a case where there are transmission antennas on an inner portion on the front side of a vehicle and an outer portion on the rear side of the vehicle, and a portable device is in the vicinity of a rear door of the vehicle, since signal intensities of the transmission antennas on the inner portion on the front side of the vehicle become approximately equal to those of the transmission antennas on the outer portion on the rear side of the vehicle, it is erroneously determined as relay attack, whereby the passive function does not function, and a door cannot be locked, unlocked, or the like.

In addition, when adopting the countermeasure disclosed in JP-A-2010-121297, when it is determined that an authorized user is not in the vicinity of a vehicle, unlocking is inhibited by a lowering of an output value of a response signal with which the portable device responds so that an arrival distance of the response signal becomes substantially equal to an arrival distance of a response request signal that is output from the vehicle. However, since it cannot be distinguished whether the signals are received directly from the vehicle or through a repeater, it is difficult to determine whether or not the relay attack is performed in the first place.

SUMMARY

One or more embodiments of the invention provide a portable device, a communication device, and a communication system with high security with which whether or not relay attack is performed can be determined with a passive function functioning when a portable device in an authorized user's possession is in the vicinity of a vehicle, and not functioning when the portable device is not in the vicinity of the vehicle.

According to one or more embodiments of the invention, there is provided a communication system including: a communication device which is mounted on a vehicle; and a portable device which communicates with the communication device, wherein the communication device includes: a vehicle transmission unit which includes at least one transmission antenna and which transmits a plurality of first signals to the portable device, and a vehicle reception unit which receives a second signal transmitted from the portable device, wherein the portable device includes a portable device reception unit which receives the plurality of first signals transmitted from the vehicle transmission unit, and a portable device controller which detects signal intensities of the plurality of first signals received by the portable device reception unit, and which compares the signal intensities of the plurality of first signals, and a portable device transmission unit which transmits the second signal to the vehicle reception unit according to control of the portable device controller, and wherein the portable device controller sets an output value of the second signal to a predetermined value when a difference between the compared signal intensities of the plurality of first signals is equal to or less than a threshold.

In this case, since the portable device changes an output value of signals to be transmitted based on a difference between intensities of a plurality of received signals, it is possible to provide a communication system with high security with which whether or not relay attack is performed can be determined with a passive function functioning when a portable device is in the vicinity of a vehicle, and not functioning when the portable device is not in the vicinity of the vehicle.

Furthermore, the portable device controller may set the output value of the second signal according to magnitude of the difference between the compared signal intensities of the plurality of first signals.

In this case, it is possible to flexibly set an output value of signals to be transmitted based on the magnitude of a difference between intensities of the plurality of received signals.

Furthermore, the vehicle transmission unit may include a plurality of the transmission antennas, and the plurality of first signals to be compared may be transmitted from the transmission antennas which are different from one another.

In this case, it is possible to change an output value of a signal to be transmitted from a portable device based on a difference between intensities of signals that are transmitted from transmission antennas that are disposed in different positions on a vehicle.

Furthermore, the vehicle transmission unit may include one transmission antenna, and the plurality of first signals to be compared may be transmitted from the transmission antenna with at least two different signal intensities.

In this case, it is possible to change an output value of a signal to be transmitted from a portable device based on a difference between intensities of signals that are transmitted from one transmission antenna.

According to one or more embodiments of the invention, there is provided a portable device which communicates with a communication device mounted on a vehicle, the portable device including: a portable device reception unit which receives a plurality of first signals transmitted from the communication device; a portable device controller which detects signal intensities of the plurality of first signals received by the portable device reception unit, and which compares the signal intensities of the plurality of first signals; and a portable device transmission unit which transmits a second signal to the communication device according to control of the portable device controller, wherein the portable device controller sets an output value of the second signal to a predetermined value or less when a difference between the compared signal intensities of the plurality of first signals is equal to or less than a threshold.

In this case, since the portable device changes an output value of signals to be transmitted based on the difference between intensities of a plurality of received signals, it is possible to provide the portable device with high security with which whether or not relay attack is performed can be determined with a passive function functioning when a portable device is in the vicinity of a vehicle, and not functioning when the portable device is not in the vicinity of the vehicle.

According to one or more embodiments of the invention, there is provided a communication system including a communication device which is mounted on a vehicle; and a portable device which communicates with the communication device, wherein the communication device includes: a vehicle transmission unit which includes at least one transmission antenna, and which transmits a plurality of first signals to the portable device, a vehicle reception unit which includes at least one reception antenna, and which receives a second signal from the portable device, and a communication device controller which controls a reception threshold of the reception antenna based on the second signal received by the vehicle reception unit, wherein the portable device includes: a portable device reception unit which receives the plurality of first signals from the vehicle transmission unit, a portable device transmission unit which transmits the second signal to the vehicle reception unit, and a portable device controller which detects signal intensities of the plurality of first signals received by the portable device reception unit, and which transmits information of the detected signal intensities of the plurality of first signals from the portable device transmission unit through the second signal, and wherein the communication device controller compares the signal intensities of the plurality of first signals based on the information of the signal intensities of the plurality of first signals received through the second signal, and sets a reception threshold of the reception antenna receiving the second signal to a predetermined value or more when a difference between the compared signal intensities of the plurality of first signals is equal to or less than a threshold.

In this case, since the communication device mounted on the vehicle changes a reception threshold of a vehicle mounted antenna based on a difference between intensities of a plurality of signals received by the portable device, it is possible to provide a communication system with which whether or not relay attack is performed can be determined with a passive function functioning when a portable device is in the vicinity of a vehicle, and not functioning when the portable device is not in the vicinity of the vehicle.

Furthermore, the communication device controller may set the reception threshold of the reception antenna receiving the second signal according to magnitude of the difference between the compared signal intensities of the plurality of first signals.

In this case, it is possible to flexibly set a reception threshold of a reception antenna that receives a signal that is transmitted based on the magnitude of a difference between the intensities in the plurality of received signals.

Furthermore, the vehicle transmission unit may include a plurality of the transmission antennas, and the plurality of first signals to be compared may be transmitted from the transmission antennas which are different from each other.

In this case, the communication device mounted on the vehicle can change a reception threshold of a vehicle mounted antenna based on a difference between intensities of signals received by the portable device which are transmitted from the transmission antennas disposed in various positions on the vehicle.

Furthermore, the vehicle transmission unit may include one transmission antenna, and the plurality of first signals to be compared may be transmitted from the transmission antenna with at least two different signal intensities.

In this case, the communication device mounted on the vehicle can change a reception threshold of a vehicle mounted antenna based on a difference between intensities of signals received by the portable device which are transmitted from one transmission antenna.

According to one or more embodiments of the invention, there is provided a communication device which is mounted on a vehicle and which communicates with a portable device, the communication device including: a vehicle transmission unit which includes at least one transmission antenna, and which transmits a plurality of first signals to the portable device; a vehicle reception unit which includes a reception antenna, and which receives a second signal from the portable device; and a communication device controller which controls a reception threshold of the reception antenna based on the second signal received by the vehicle reception unit, wherein the communication device controller compares signal intensities of the plurality of first signals based on information of the signal intensities of the plurality of first signals received through the second signal, and sets a reception threshold of the reception antenna receiving the second signal to a predetermined value or more when a difference between the compared signal intensities of the plurality of first signals is equal to or less than a threshold.

In this case, since the communication device mounted on the vehicle changes a reception threshold of a vehicle mounted antenna based on the difference between intensities of a plurality of signals received by the portable device, it is possible to provide a communication device with high security with which whether or not relay attack is performed can be determined with a passive function functioning when a portable device is in the vicinity of a vehicle, and not functioning when the portable device is not in the vicinity of the vehicle.

As described above, according to one or more embodiments of the invention, it is possible to provide a portable device, a communication device, and a communication system with high security with which whether or not relay attack is performed can be determined with a passive function functioning when a portable device in an authorized user's possession is in the vicinity of a vehicle, and not functioning when the portable device is not in the vicinity of the vehicle.

DETAILED DESCRIPTION

Figure 1:
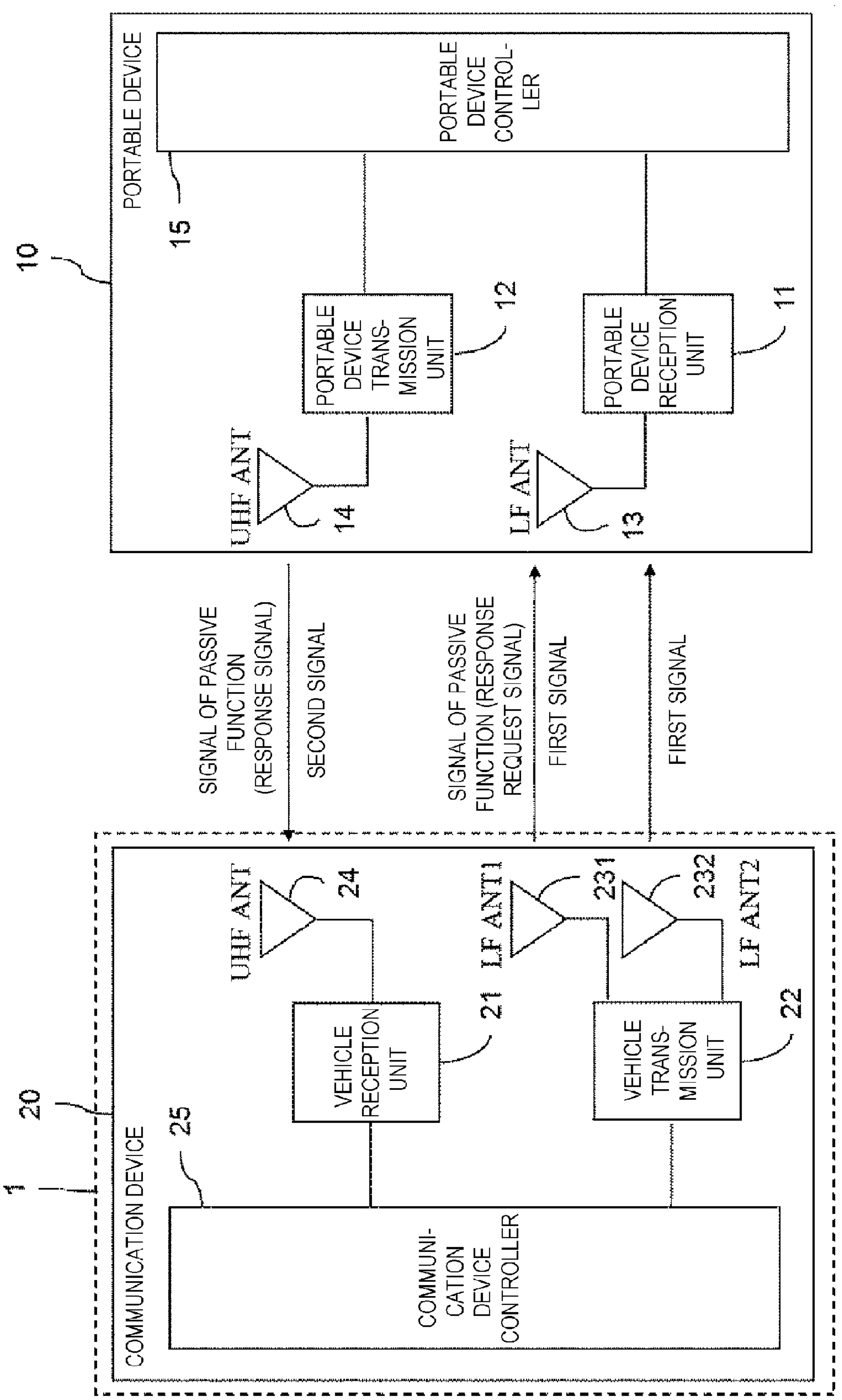
FIG. 1 is a block diagram of a communication system according to a first embodiment of the present invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments according to the invention will be described with reference to the drawings.

First Embodiment

First, referring to FIGS. 1 to 4, a communication system 100 of this embodiment will be described. The communication system 100 includes a communication device 20 (referred to as a vehicle electronic control unit (ECU)) that is mounted on a vehicle 1 and a portable device 10 that performs wireless communication with the communication device 20.

The communication device 20 includes two transmission antennas 231 and 232 (LF ANT 1, LF ANT 2), a vehicle transmission unit 22 that transmits a response request signal that is a first signal to the portable device 10, a UHF antenna 24 and a vehicle reception unit 21 that receive a response signal that is a second signal from the portable device 10, and a communication device controller 25 that controls communication with the portable device 10 using the vehicle reception unit 21 and the vehicle transmission unit 22. The vehicle transmission unit 22 transmits the response request signals through two transmission antennas 231 and 232. In addition, in this embodiment, the vehicle transmission unit 22 includes two transmission antennas. However, the present invention is not limited thereto, and the vehicle transmission unit 22 may include one transmission antenna or more.

The portable device 10, in order to correspond to the communication device 20 described above, includes an LF ANT 13 and a portable device reception unit 11 that receive two response request signals that are transmitted from the vehicle transmission unit 22, a portable device controller 15 that detects signal intensities of two response request signals that are received by the portable device reception unit 11 and compares the signal intensities of the two response request signals, and a portable device transmission unit 12 and a UHF ANT 14 that transmit a response signal that is a second signal in response to the response request signal to the vehicle reception unit 21 according to control of the portable device controller 15. In order to simplify description in the embodiment, the transmission antenna 231 and the transmission antenna 232 each of which transmits one response request signal are described. However, the present invention is not limited thereto and each transmission antenna may transmit one response request signal or more.

Figure 2A:
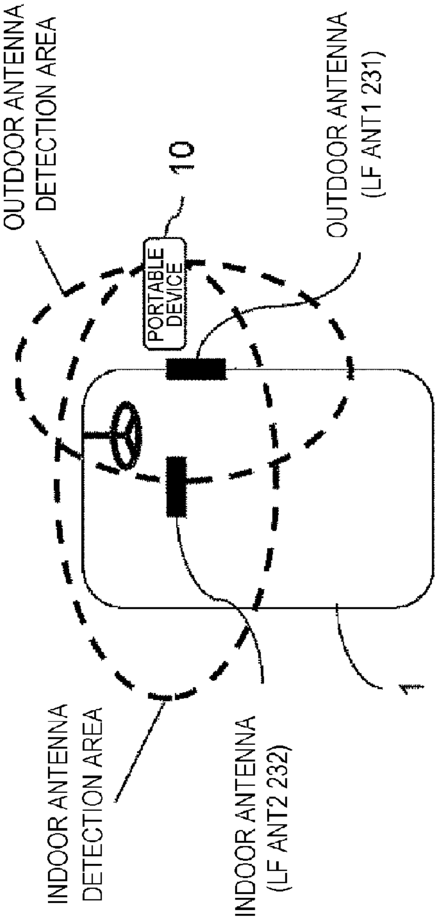
FIG. 2A is an explanatory diagram illustrating a plurality of LF antennas and detection areas in the communication system according to a first embodiment of the invention.

In the communication from the vehicle transmission unit 22 of the communication device 20 to the portable device reception unit 11 of the portable device 10, wireless communication is generally performed using an electric wave in a low frequency (LF) bandwidth. In addition, in the communication from the portable device transmission unit 12 of the portable device 10 to the vehicle reception unit 21 of the communication device 20, wireless communication is generally performed using an electric wave in an ultra high frequency (UHF) bandwidth. Since wave length in the LF bandwidth is longer and more rapidly reduced (inversely proportional to the cube of a distance) in intensity than the UHF bandwidth, an area in which a response request signal can be detected is formed only in the vicinity of the vehicle. For example, as illustrated in FIG. 2A, an outdoor antenna (LF ANT1) 231 which is disposed in a driver seat door of the vehicle 1 transmits an electric wave in an LF bandwidth, and forms an outdoor antenna detection area as illustrated by the dotted line (elliptical portion extending in the longitudinal direction in the figure). An indoor antenna (LF ANT2) 232 which is disposed in a center of an interior front portion of the vehicle forms a similar indoor antenna detection area (elliptical portion extending in the lateral direction in the figure).

When the portable device 10 is in both of the outdoor antenna detection area and the indoor antenna detection area described above, the portable device 10 receives a response request signal from the both of the outdoor and indoor antennas. In the portable device 10, when the portable device reception unit 11 receives a response request signal that is an electric wave in an LF bandwidth, the portable device controller 15 detects a receive signal strength indication (RSSI) that is an intensity of the electric wave in an LF bandwidth with respect to each response request signal. When the portable device 10 is closer to the outdoor antenna than the indoor antenna as in FIG. 2A, the RSSI of a signal which is transmitted through the outdoor antenna is greater than that of a signal which is transmitted through the indoor antenna.

In this manner, the RSSI of a signal in an LF bandwidth that is transmitted from transmission antennas that are disposed in plural different positions is usually different from each other in a case where the portable device 10 is in a detection area. When the portable device 10 is in the center between two antennas, values of two RSSIs are approximately equal to each other. However, even in this case, when the RSSI of a third signal or more from the transmission antenna is detected, values of the two RSSIs are different from each other. Difference (ΔRSSI) between the two compared RSSIs can be expressed as a difference or a ratio. In a case of the present embodiment, the communication device 20 includes a plurality of transmission antennas, and a plurality of response request signals to be compared are response request signals that are transmitted from different transmission antennas. According to this, it is possible to accurately determine whether or not the relay attack is being performed based on the difference between intensities of signals that are transmitted from the transmission antennas disposed in various positions on the vehicle.

Figure 2B:
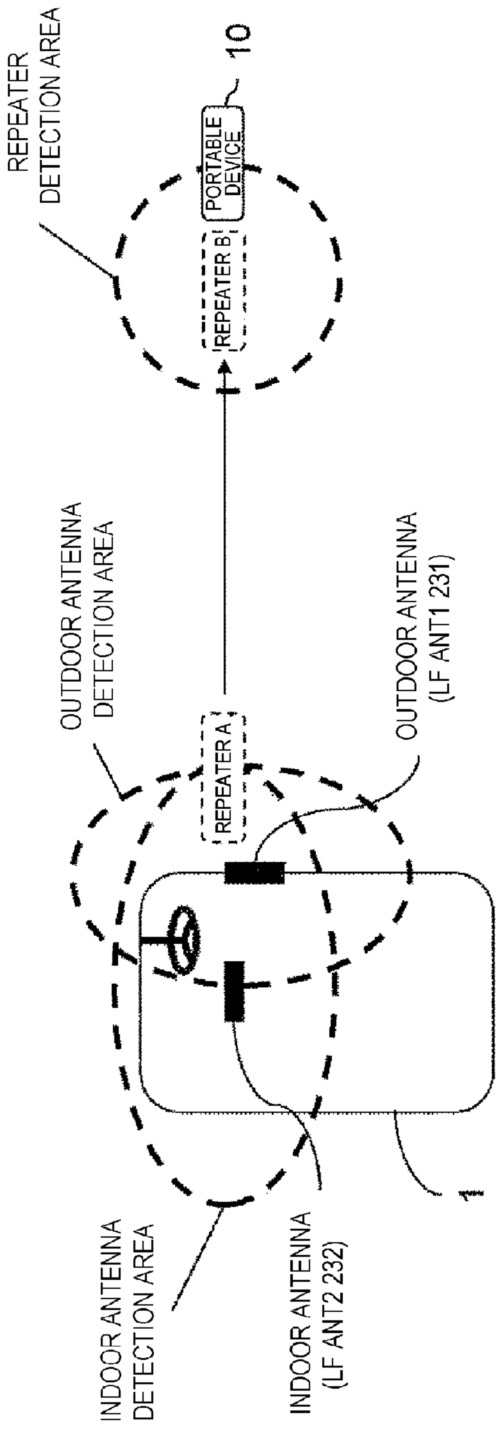
FIG. 2B is an explanatory diagram illustrating a state where relay attack is performed in the communication system according to the first embodiment of the invention.

When relay attack is being performed, as illustrated in FIG. 2B, the portable device 10 does not directly receive response request signals that are transmitted from the indoor antenna and the outdoor antenna, and receives signals that are copied by a repeater B. Since the two copied response request signals are transmitted with the same intensity from one transmission antenna that is provided in the repeater B, the ΔRSSI of electric wave signals in an LF bandwidth that are received by the portable device 10 is not expressed as a significant difference (if expressed by a difference, ΔRSSI is approximately zero, if expressed by a ratio, ΔRSSI is approximately 1). As described above, in a normal case where relay attack is not performed, it is possible to express a value of the ΔRSSI as a significant difference.

Figure 3:
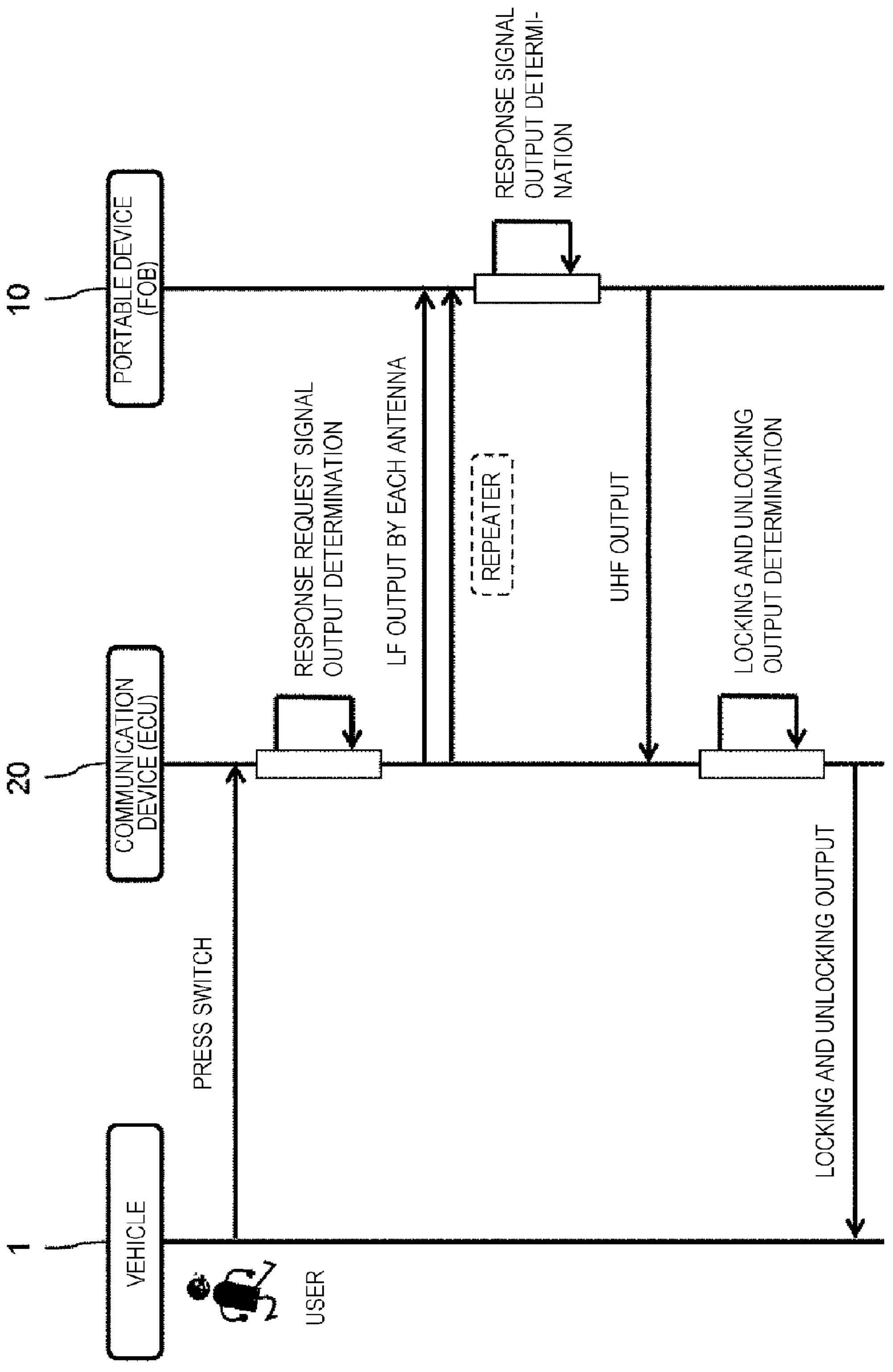
FIG. 3 is a timing chart in the communication system according to the first embodiment of the invention.

FIG. 3 is a description illustrating a passive function in more detail. When a user who owns a normal portable device 10 of the vehicle 1 presses a switch for unlocking a door on a door knob or the like of the vehicle 1, information indicating that the user has pressed the switch is transmitted to the communication device 20 of the vehicle. When the information is transmitted, the communication device 20 determines whether or not to output a response request signal in order to transmit the response request signal requesting a response to the portable device 10. When transmitting the response request signal, the communication device 20 outputs at least one response request signal from the plurality of transmission antennas (in this embodiment, two transmission antennas 231, 232) as an electric wave signal in an LF bandwidth. As described above, if an electric wave in an LF bandwidth does not reach very far and there is a repeater, the repeater intervenes in the communication in the LF bandwidth.

Figure 4:
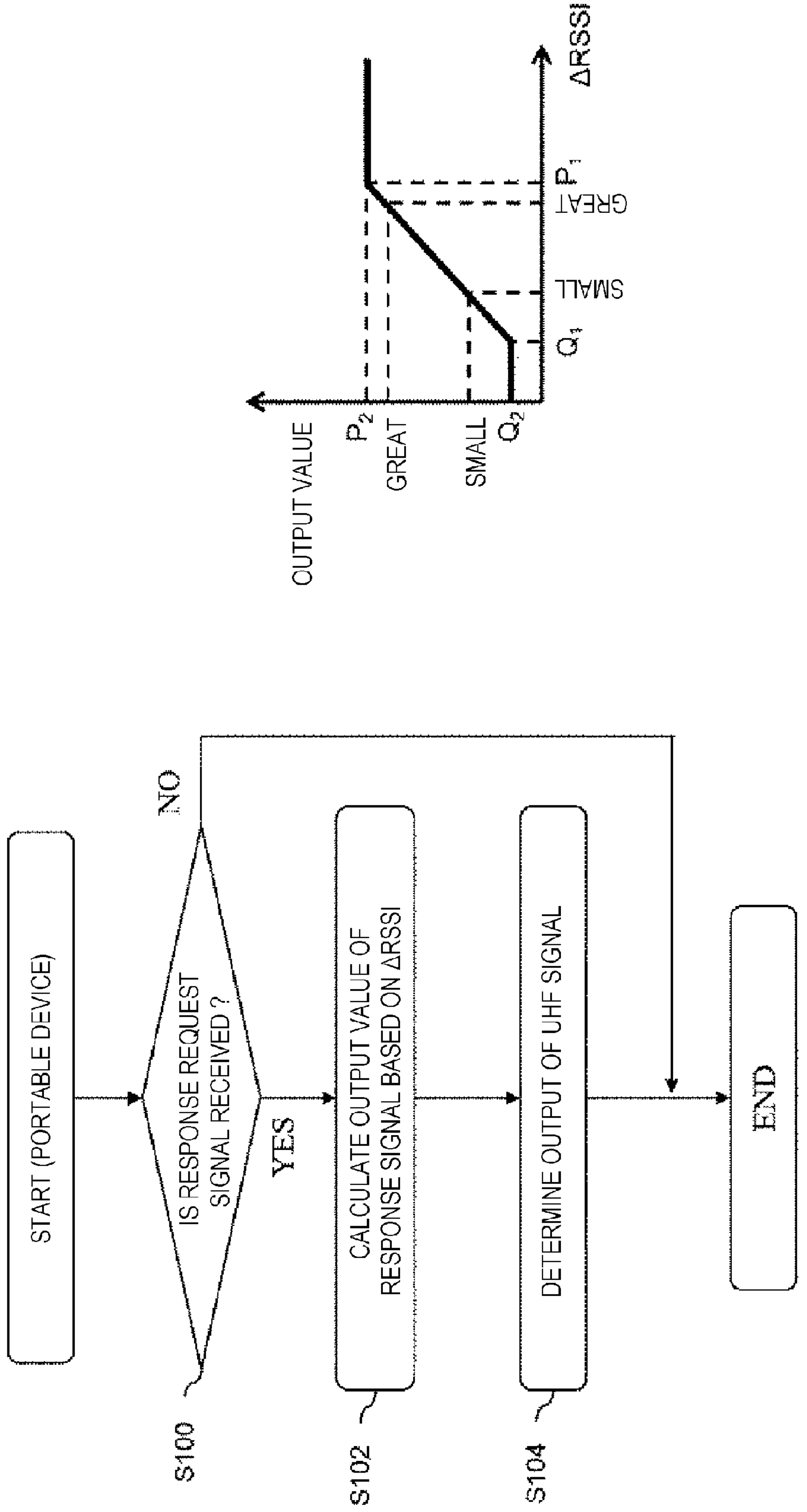
FIG. 4 is a flow chart in the communication system according to the first embodiment of the invention.

When a response request signal is received from the communication device 20, the portable device 10 determines output of a response signal as illustrated in FIG. 4. When the output of the response signal is determined, the portable device 10 outputs a response signal with an output value to be described later, including authentication information or the like of the portable device 10 from a UHF ANT 14 as an electric wave signal in a UHF bandwidth. When the response signal is received by the UHF ANT 24, the communication device 20 inspects the authentication information or the like. When determining that the portable device 10 is a normal portable device, the communication device 20 outputs information regarding unlocking and locking of an opening and closing mechanism such as a door. The vehicle 1 (specifically, controller (not shown) that controls the unlocking and locking of an opening and closing mechanism such as a door) that receives the output operates the door or the like according to the output.

FIG. 4 illustrates output determination of a response signal in the portable device 10 in more detail. In addition, the S in the flow chart illustrates steps. In S100, the portable device 10 waits for a response request signal from a corresponding vehicle 1. While there is no action in the portable device 10 when not receiving the response request signal, when the portable device 10 receives the response request signal, in S102, the portable device controller 15 detects the signal intensities of all of the received response request signals and compares these signal intensities. The portable device controller 15 calculates the difference (ΔRSSI) between these signal intensities as a difference, a ratio, or the like by comparing the signal intensities. Therefore, in S104, the portable device controller 15 determines output of a UHF signal with the calculated output values.

When there is a significant difference in ΔRSSI between a case where relay attack is performed and a case where relay is not performed, it is determined that there is no relay attack when the ΔRSSI shows the significant difference and it is determined that there is a high possibility of the occurrence of relay attack when the ΔRSSI does not show the significant difference and then the output values may be changed, as a comparison result. For example, when it is not recognized that the difference (ΔRSSI) between these signal intensities is significant as a comparison result, that is, when determining that there is a high possibility of the occurrence of relay attack, the portable device controller 15 changes the output values of the electric wave signal, which is a response signal, in the UHF bandwidth to be small. Inversely, when it is recognized that the ΔRSSI is significant, that is, when it is not determined that there is a high possibility of the occurrence of relay attack, the portable device controller 15 does not change the output values of the electric wave signal, which is a response signal, in the UHF bandwidth.

However, since it is difficult to clearly provide the magnitude of the significant difference because the signal intensity of the response request signal fluctuates, it is preferable to calculate an output value using a method that is illustrated in a graph on the right side in this figure. That is, it can be found from the graph that there is a case where the output value is in a relationship of a first-order linear with the ΔRSSI and a case where the output value becomes a constant value regardless of values of the ΔRSSI.

When the ΔRSSI is equal to or greater than a predetermined value ($P_1$), an output value is constant at $P_2$. This is because it is not necessary to further increase the output value in a case where the ΔRSSI is significant, since it is possible to determine that there is no relay attack in this case.

When the ΔRSSI is equal to or less than a predetermined value ($Q_1$), an output value is constant at $Q_1$ and does not become zero regardless of how small the ΔRSSI is. This is because a response signal in a UHF bandwidth has to be output in a detection area (in the vicinity of 1 m from the vehicle) of electric wave in a normal LF bandwidth. The output value is changed between $Q_2$ and $P_2$ when the ΔRSSI is between $Q_1$ and $P_1$. In addition, the graph shows a relationship of a first-order linear. However, the present invention is not limited thereto. In this manner, when the ΔRSSI is small, that is, in a state where there is a high possibility that the relay attack is performed, by reducing output values of a response signal in a UHF bandwidth in accordance with a value of ΔRSSI, it is possible to prevent the unlocking of a door or the like because the response signal does not reach the vehicle, when the portable device 10 is far from the vehicle.

In other words, the portable device controller 15 may set output values of response signals that are transmitted from the portable device transmission unit 12 according to magnitude of difference (ΔRSSI) between compared signal intensities of the plurality of response request signals. For example, when the difference between the signal intensities is relatively great, the output value of the response signal can be relatively great. When the difference between the signal intensities is relatively small, the output value of the response signal can be relatively small. According to this, it is possible to flexibly set an output value of signals to be transmitted based on magnitude of the difference between intensities of the plurality of received signals.

That is, when difference (ΔRSSI) between compared signal intensities (RSSI) of the plurality of response request signals is equal to or less than a threshold, the portable device controller 15 sets an output value of the response signal that is transmitted by the portable device transmission unit 12 from the UHF ANT 14 to a predetermined value. For example, when the difference (ΔRSSI) between the signal intensities is represented as a ratio, if the difference is equal to or less than approximately 15%, it is determined that relay attack is performed. In addition, an output value of a response signal is an output value, which is appropriately adjusted, such as a distance of several m from a vehicle in a case of locking or unlocking and a distance capable of communicating within the vehicle in a case of starting the engine. According to this, it is possible to provide a communication system with high security with which whether or not relay attack is performed can be determined with a passive function functioning when a portable device is in the vicinity of a vehicle, and not functioning when the portable device is not in the vicinity of the vehicle.

Modification Example of First Embodiment

Figure 5:
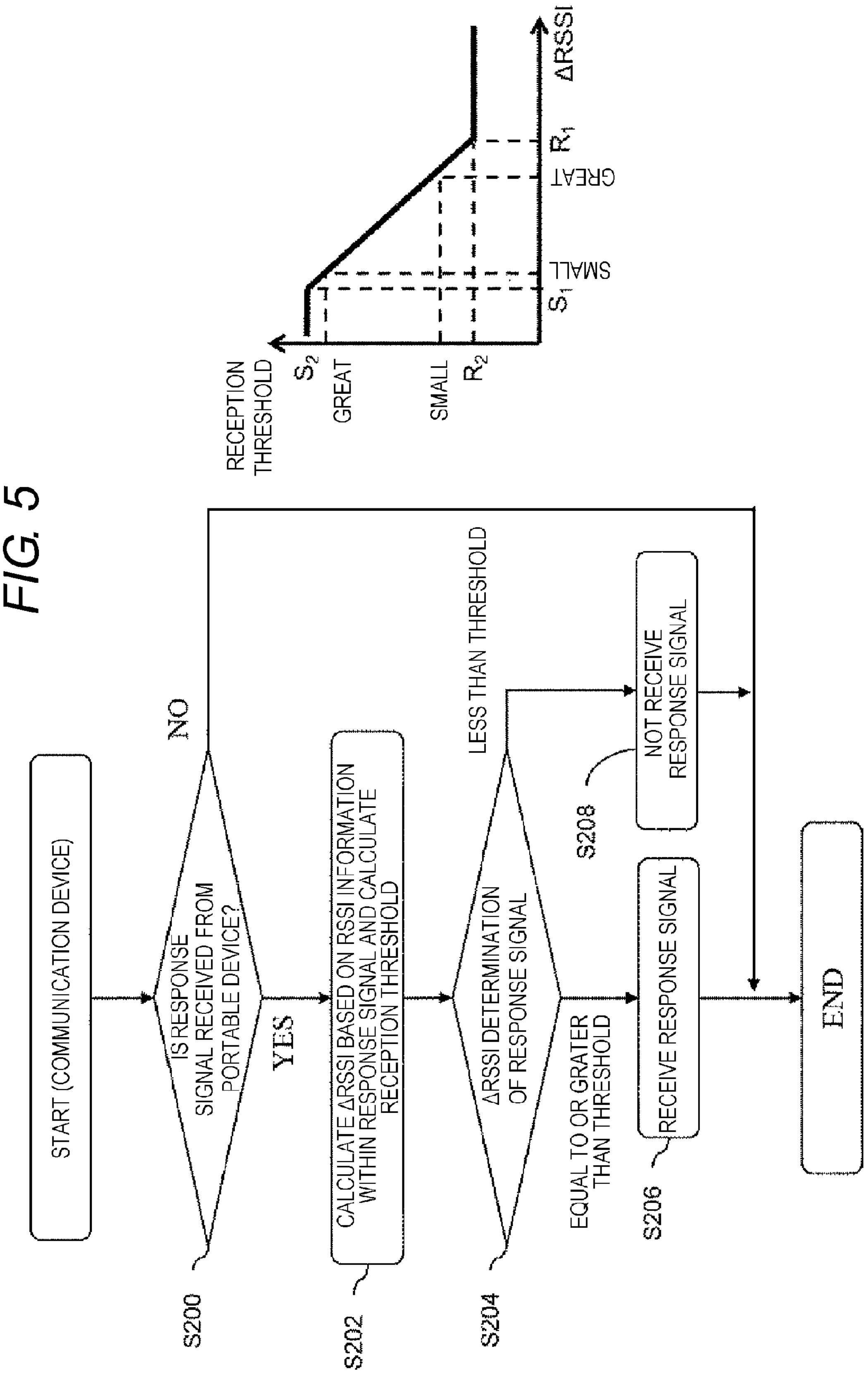
FIG. 5 is a flow chart in the communication system according to a modification example of the first embodiment of the invention.

The communication system 100 of this modification example will be described with reference to FIG. 5. In order to avoid duplicate description, differences with the embodiment will be mainly described. A configuration of the communication system 100 in the modification example is the same as that of the embodiments described above except for a difference below. The difference is that the communication system 100 changes an output value of a response signal according to the ΔRSSI in the embodiment, but in the modification example, as described below, the communication system 100 changes a threshold in the communication device 20 that is used for receiving a response signal according to the ΔRSSI.

The communication device 20, in S200, waits for a response signal including LF intensity (RSSI) information pertaining to a time when the portable device 10 receives a response request signal and authentication information, the response signal corresponding to the response request signal that is transmitted from the communication device 20. Although the communication device 20 is not operated when not receiving the response signal, when the communication device 20 receives a response signal including RSSI information, in S202, the communication device controller 25 calculates a difference (ΔRSSI) between RSSIs, from RSSI information that is included in the response signal that is received, and calculates a reception threshold of a response signal based on the ΔRSSI. In S204, the communication device controller 25 receives a response signal when a response signal to be received is equal to or greater than a reception threshold which is obtained based on the calculated ΔRSSI (S206), and does not receive the response signal when the response signal is less than the reception threshold (S208).

Similar to the embodiment, it is preferable that a reception threshold is calculated using a method as illustrated in the graph on the right side of this figure. That is, it can be found from the graph that there is a case where a reception threshold is in a relationship of a first-order linear with the ΔRSSI and a case where the output value becomes a constant value regardless of the values of the ΔRSSI. When the ΔRSSI is equal to or greater than a predetermined value ($R_1$), the reception threshold is constant at $R_2$. This is because it is not necessary to further reduce the reception threshold in a case where the ΔRSSI is significant, since it is possible to determine that there is no relay attack in this case.

When the ΔRSSI is equal to or less than a predetermined value ($S_1$), the reception threshold is constant at $S_2$ and the reception threshold is a constant value ($S_2$) regardless of how much small the ΔRSSI is. This is because a response signal in a UHF bandwidth has to be received in the detection area of the electric wave in the normal LF bandwidth. When the ΔRSSI is between $S_1$ and $R_1$, the reception threshold is changed between $R_2$ and $S_2$. The graph shows a relationship of a first-order linear. However, the present invention is not limited to the relationship of the first-order linear. In this manner, when ΔRSSI is small, that is, in a state where there is a high possibility that relay attack is being performed, by increasing a reception threshold of the response signal in a UHF bandwidth in accordance with a value of ΔRSSI, it is possible to prevent the unlocking of a door or the like because the communication device does not receive a response signal.

In other words, the communication device controller 25 may set a reception threshold of a reception antenna that receives a response signal according to the magnitude of the difference (ΔRSSI) between the compared signal intensities of the plurality of response request signals. For example, when the difference between the signal intensities is relatively great, a reception threshold of the reception antenna can be relatively small. When the difference between the signal intensities is relatively small, the reception threshold of the reception antenna can be relatively great. According to this, it is possible to flexibly set a reception threshold of the reception antenna that receives signals to be transmitted based on the magnitude of the difference between intensities of the plurality of received signals.

That is, the communication device controller 25 compares signal intensities based on information of signal intensities (RSSI) of a plurality of the response request signals received through a response signal and sets a reception threshold of the reception antenna UHF ANT 24 that receives a response signal to be equal to or greater than a predetermined value when the difference (ΔRSSI) between the compared signal intensities of the plurality of response request signals is equal to or less than a threshold. According to this, since the portable device changes a reception threshold of a vehicle antenna based on the difference between intensities of the plurality of signals received, it is possible to provide a communication system with high security with which whether or not relay attack is performed can be determined with a passive function functioning when a portable device is in the vicinity of a vehicle, and not functioning when the portable device is not in the vicinity of the vehicle.

Second Embodiment

Figure 6:
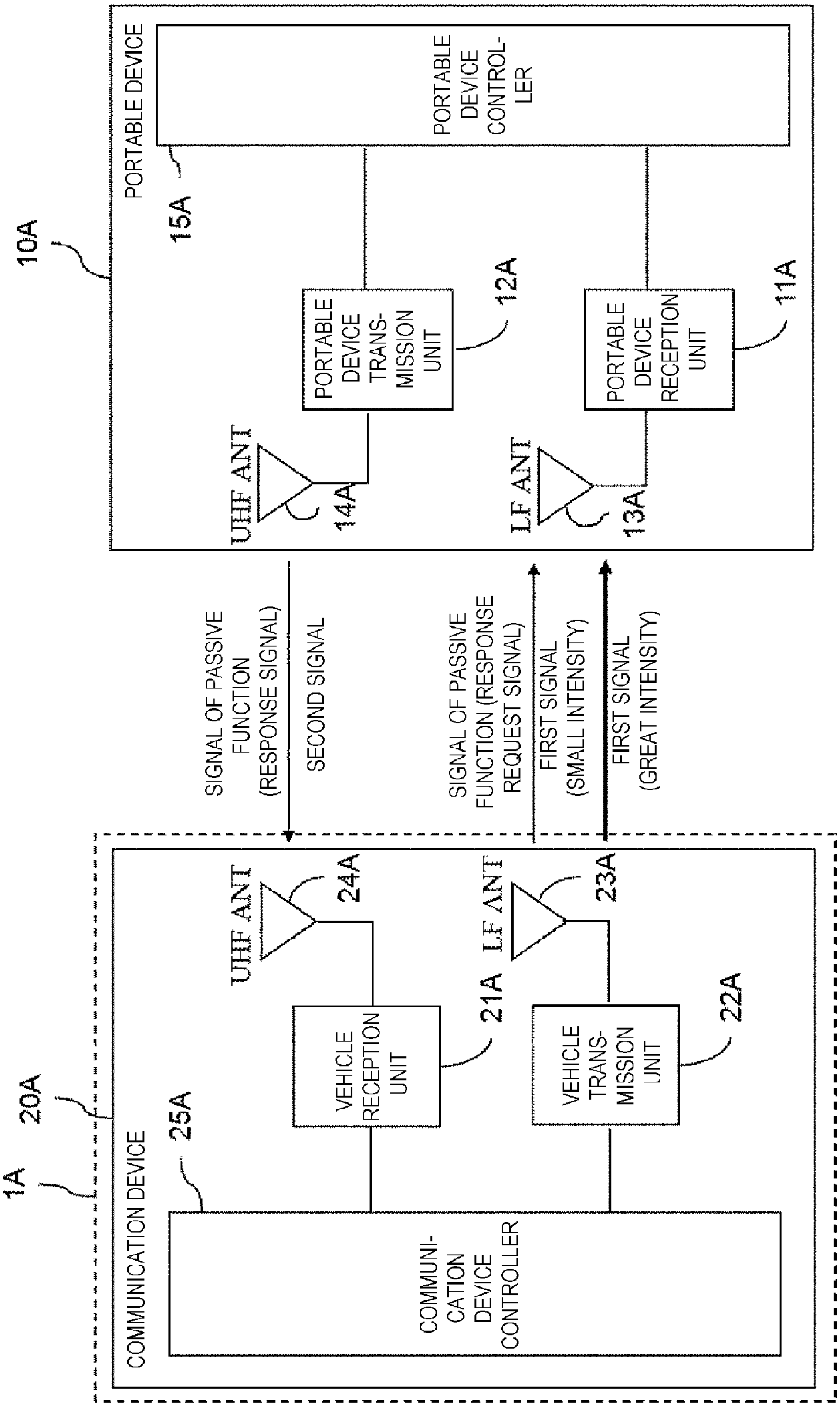
FIG. 6 is a block diagram of a communication system according to a second embodiment of the invention.

A communication system 100A according to the embodiment will be described with reference to FIG. 6. In order to avoid duplicate description, differences with the embodiment will be mainly described. In the configuration, the communication system 100 is different from the communication system 100A in that the communication system 100 has two transmission antennas (LF ANT) in the communication device 20 and the communication system 100A has one transmission antenna (LF ANT) in the communication device 20A. In addition, in the above embodiment, a response request signal is transmitted with single LF intensity (single RSSI) from each of the plural transmission antennas. However, in this embodiment, a vehicle transmission unit 22A transmits response request signals with at least two LF intensities that are different from each other from one transmission antenna 23A. In this figure, the vehicle transmission unit 22A transmits response request signals with the same content with small intensity and great intensity.

Similar to the above embodiment, the portable device 10A receives two response request signals that are transmitted from the vehicle transmission unit 22A, detects signal intensities of the two response request signals, and compares two signal intensities of the two response request signals. According to this, the portable device 10A calculates the ΔRSSI and calculates an output value of a UHF signal based on this ΔRSSI, and the communication device 20A calculates a reception threshold based on the ΔRSSI similar to the above embodiment. Therefore, in the communication device 20A, by implementing the vehicle transmission unit 22A having one transmission antenna, it is possible to achieve the same effect as the vehicle transmission unit 22 having plural transmission antennas.

The present invention is not limited to the illustrated embodiment, and it is possible to implement modifications in the configuration of the range that does not depart from contents in the claims. That is, although the present invention is mainly illustrated and described by the specific embodiments, and has been described, without departing from the spirit and purpose of the scope of the invention as the embodiments described above, quantities, and other details in the detailed configuration are intended to enable those skilled in the art to make various modifications.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A communication system comprising:

a communication device which is mounted on a vehicle; and a portable device which communicates with the communication device, wherein the communication device comprises:

a vehicle transmission unit which comprises at least one transmission antenna, and which transmits a plurality of first signals to the portable device, and a vehicle reception unit which receives a second signal transmitted from the portable device, wherein the portable device comprises:

a portable device reception unit which receives the plurality of first signals transmitted from the vehicle transmission unit, a portable device controller which detects signal intensities of the plurality of first signals received by the portable device reception unit, and which compares the signal intensities of the plurality of first signals, and a portable device transmission unit which transmits the second signal to the vehicle reception unit according to control of the portable device controller, and wherein the portable device controller sets an output value of the second signal to a predetermined value when a difference between the compared signal intensities of the plurality of first signals is equal to or less than a threshold.

2. The communication system according to claim 1, wherein the portable device controller sets the output value of the second signal according to magnitude of the difference between the compared signal intensities of the plurality of first signals.

3. The communication system according to claim 1, wherein the vehicle transmission unit comprises a plurality of the transmission antennas, and the plurality of first signals to be compared are transmitted from the transmission antennas which are different from one another.

4. The communication system according to claim 1, wherein the vehicle transmission unit includes one transmission antenna, and the plurality of first signals to be compared are transmitted from the transmission antenna with at least two different signal intensities.

5. A portable device which communicates with a communication device mounted on a vehicle, the portable device comprising:

a portable device reception unit which receives a plurality of first signals transmitted from the communication device;

a portable device controller which detects signal intensities of the plurality of first signals received by the portable device reception unit, and which compares the signal intensities of the plurality of first signals; and a portable device transmission unit which transmits a second signal to the communication device according to control of the portable device controller, wherein the portable device controller sets an output value of the second signal to a predetermined value when a difference between the compared signal intensities of the plurality of first signals is equal to or less than a threshold.

6. A communication system comprising:

a communication device which is mounted on a vehicle; and a portable device which communicates with the communication device, wherein the communication device comprises:

a vehicle transmission unit which comprises at least one transmission antenna, and which transmits a plurality of first signals to the portable device, a vehicle reception unit which comprises a reception antenna, and which receives a second signal from the portable device, and a communication device controller which controls a reception threshold of the reception antenna based on the second signal received by the vehicle reception unit, wherein the portable device comprises:

a portable device reception unit which receives the plurality of first signals from the vehicle transmission unit, a portable device transmission unit which transmits the second signal to the vehicle reception unit, and a portable device controller which detects signal intensities of the plurality of first signals received by the portable device reception unit, and which transmits information of the detected signal intensities of the plurality of first signals from the portable device transmission unit through the second signal, and wherein the communication device controller compares the signal intensities of the plurality of first signals based on the information of the signal intensities of the plurality of first signals received through the second signal, and sets a reception threshold of the reception antenna receiving the second signal to a predetermined value when a difference between the compared signal intensities of the plurality of first signals is equal to or less than a threshold.

7. The communication system according to claim 6, wherein the communication device controller sets the reception threshold of the reception antenna receiving the second signal according to magnitude of the difference between the compared signal intensities of the plurality of first signals.

8. The communication system according to claim 6, wherein the vehicle transmission unit comprises a plurality of the transmission antennas, and the plurality of first signals to be compared are transmitted from the transmission antennas which are different from each other.

9. The communication system according to claim 6, wherein the vehicle transmission unit comprises one transmission antenna, and the plurality of first signals to be compared are transmitted from the transmission antenna with at least two different signal intensities.

10. A communication device which is mounted on a vehicle and which communicates with a portable device, the communication device comprising:

a vehicle transmission unit which comprises at least one transmission antenna, and which transmits a plurality of first signals to the portable device;

a vehicle reception unit which comprises a reception antenna, and which receives a second signal from the portable device; and a communication device controller which controls a reception threshold of the reception antenna based on the second signal received by the vehicle reception unit, wherein the communication device controller compares signal intensities of the plurality of first signals based on information of the signal intensities of the plurality of first signals received through the second signal, and sets a reception threshold of the reception antenna receiving the second signal to a predetermined value when a difference between the compared signal intensities of the plurality of first signals is equal to or less than a threshold.

* * * * *